Feb. 16, 1965    G. W. CHENEY ETAL    3,170,011
METHOD AND APPARATUS FOR MAKING FILM
Filed Feb. 14, 1962    2 Sheets-Sheet 1

INVENTORS.
Grant W. Cheney
Frank T. Hughes
BY Jerome Rudy
ATTORNEY

INVENTORS.
Grant W. Cheney
Frank T. Hughes
BY Jerome Rudy
ATTORNEY

_United States Patent Office_ 3,170,011
Patented Feb. 16, 1965

3,170,011
METHOD AND APPARATUS FOR MAKING FILM
Grant W. Cheney, Midland, Mich., and Frank T. Hughes, Rolling Hills, Calif., assignors to The Dow Chemical Company, Midland, Mich., a corporation of Delaware
Filed Feb. 14, 1962, Ser. No. 173,270
31 Claims. (Cl. 264—95)

The present invention contributes to the art of manufacturing film from thermoplastic resinous materials. In particular, this invention relates to an improved and highly advantageous method and apparatus for the manufacture, in tubular form, of relatively thin film from various film-forming thermoplastic resinous materials. It has more particular reference (but is not restricted) to an especially useful method and apparatus for the production of film from polymers of non-aromatic or aliphatic hydrocarbon olefins, such as polyethylene, polypropylene and the like.

It is advantageous to manufacture film of many thermoplastic resinous materials in tubular form. In such practice, it is oftentimes desirable (and may even be necessary) to orient the freshly extruded film simultaneous with its extrusion by stretching it uniformly throughout the directions of its major dimensions.

An efficacious technique for accomplishing such orientation utilizes the distending effect of a trapped pocket or bubble of gas which is enveloped under pressure within the tubular film simultaneously with its initial formation. A tubulation process of this nature has been disclosed in U.S. 2,461,975. U.S. 2,832,994 discloses another method of manufacturing film in this manner. Such a process has become known, and is frequently referred to, as the "trapped bubble" process for the manufacture of tubular film.

One of the paramount considerations involved in the manufacture of thermoplastic tubular film by the trapped bubble process is that of sizing and cooling the extruded tubing. Proper and efficient cooling of the freshly extruded tube simultaneous with or, actually, prior to its orientation is highly advantageous to secure optimum properties in the manufactured film product. It has been proposed and it is known to employ air or other gaseous fluid as a cooling medium for the freshly extruded film tube in the trapped bubble process using either external or internal, or both, circulation and contact of the cooling fluid upon the tube during its orientation. U.S. 2,433,937; 2,668,323; 2,668,324; 2,697,852; and 2,844,846 are illustrative of various techniques and procedures that have been employed for cooling the freshly extruded film product during its orientation in the trapped bubble process.

It would be an advantage to provide a new and improved method and apparatus for the manufacture of tubular film from practically any desired thermoplastic film-forming material capable of being utilized in the trapped bubble process wherein a much more precise and readily effective control of the temperature and cooling of the freshly extruded film could be achieved. It would also be an advantage if film tubes could be manufactured in such a way that difficulty, or inferiority of product quality, or both, due to inefficient and ineffective cooling of the freshly extruded tube could be avoided. It would be of further advantage and benefit if film tubes could be manufactured that are free from the tendency of the surfaces of the tube to "block" or adhere to each other when the tube is collapsed. It would be of particular advantage if such a method and means of manufacturing film tubes could be utilized for the production of tubular polyethylene and polypropylene film, as well as in the production of many other relatively thin gauge films comprised of other desired varieties of thermoplastic film-forming materials adaptable to being utilized in the trapped bubble process.

It would be especially advantageous if a new and improved technique for the manufacture of film in tubular form in general accordance with the trapped bubble process could be provided to facilitate the preparation of film product of an overall premium quality for many of a variety of thermoplastic film-forming materials. It would be a pronounced advantage if tubular film could be produced at significantly greately rates of production and with materially increased output from given apparatus installations without requiring changes in the die head and extrusion assembly of each particular tube manufacturing unit involved.

Therefore, the principal object of the present invention is to provide an improved method and apparatus for the preparation of tubular film from thermoplastic resinous materials.

A particular object of the invention is to provide an improved method and apparatus for operation in general accordance with the trapped bubble process in which close and accurate temperature control and efficient and efficacious cooling of the freshly extruded film product prior to or simultaneous with stretching is readily achieved upon and in the tubular extrude.

A further object of the invention is to facilitate the manufacture of a uniform high quality and regularly constant guage (or thickness) film product.

A still further object of the invention is to facilitate the manufacture of thin walled tubular film having maximum strength and generally optimum physical properties and characteristics.

A yet further object of the invention is to manufacture a tubular film that is free from natural and inherent tendency, or at least has a minimum tendency, to "block" or cohere to itself when the tube is collapsed and/or in subsequent processing or handling of the film.

An associated object of the invention is to provide a method and apparatus for the manufacture of tubular film in general accordance with the trapped bubble process wherein difficulties due to inefficient and ineffective cooling prior to or simultaneous with orientation of the freshly extruded film tube might easily be avoided.

Another object of the invention is to provide a method and apparatus that are obviously well suited for the manufacture of continuous film tubes at high rates of production and with maximum output from given apparatus installations.

Still another object of the invention is to furnish a method and apparatus for the production of film tube wherein and whereby the film product may be handled and collected after its manufacture with improved efficiency and enhanced results as regards appearance and uniformity of the taken-up rolls of film and disposition or "lay" of the film product wrapped therein as well as to avoid variations in gage throughout the film.

A still further object of the invention is to provide a new and improved method for the manufacture of tubular film and apparatus means for its accomplishment capable, according to the trapped bubble process, of readily and easily providing excellent quality product of optimum physical properties in a wide range of tube diameters using a given apparatus installation for the purpose.

Another significant object of the invention is to provide an apparatus and method that would be especially well suited for the manufacture of various polyethylene, polypropylene and the like polyolefin film in tubular form.

The foregoing and related objects are possibilitated by manufacturing a film tube of a thermoplastic, resinous film-forming material in a manner in general accordance with the trapped bubble process wherein a fused, thermoplastic film-forming composition is extruded in tubular form and distended by means of an internal gas bubble for orientation of said freshly extruded film tube prior to or during the initial stages of its orienting distention and is cooled circumferentially on its internal and external surfaces by means of a radially and circumferentially impinging stream of air or other gaseous fluid at a temperature beneath the temperature of the freshly extruded thermoplastic material.

The circumferentially impinging stream of air or other gaseous fluid within the extruded tube is directed radially outwardly from a centrally located distributor, with respect to the axis extrusion, somewhat in the manner of a pin wheel, so as to radially impinge on the inner circumferential surface of the tube a radially directed stream that is constantly moving over the inner surface of the tube.

The gaseous fluid, such as air, admitted in the radially directed stream for cooling the surface within the tube is under sufficient pressure to maintain distention of the bubble and accomplish the desired orientation of the freshly extruded film product.

While the air or other gasous cooling medium may be recirculated within the distended tube after it is radially impinged on the inner circumferential surface thereof and discharged directly to the atmosphere, it is generally advantageous for the cooling medium to be employed in a recirculated, closed, fixed volume system. Thus, the air or other gaseous cooling medium is cooled; radially directed on the inner circumferential surface of the tube; withdrawn therefrom and recirculated after being warmed within the tube through an external gas-tight system which is physically located outside of the extruding area.

Further features and the many cognate benefits and associated advantages of the invention are apparent and additionally emphasized in the ensuing description and specification, which, as it is described, is better understood with reference to the accompanying drawing, in which, insofar as is possible, like reference numerals are employed to indicate like parts, wherein:

FIGURE 1 is a schematic representation, partially in cross-sectional elevation which, in part, is diagrammatically portrayed, showing the essential elements and combinations of one embodiment of the method and an apparatus for manufacturing tubular film in accordance with the invention;

FIGURE 2, in fragmentary partially cross-sectional plan view, shows a similar extrusion in accordance with the invention wherein the cooling gaseous fluid is relayed in a cooling system;

Figure 5:
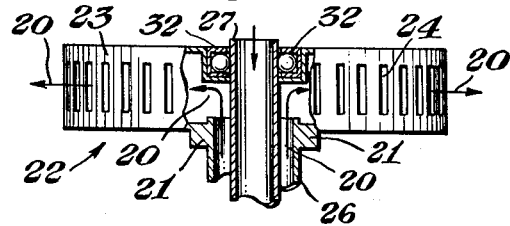
Figure 6:
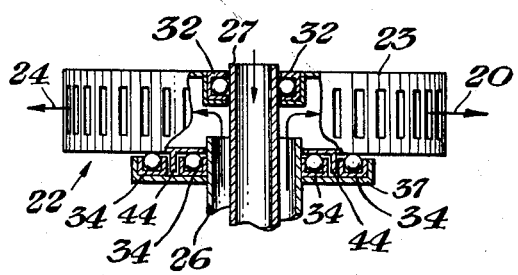
Figure 7:
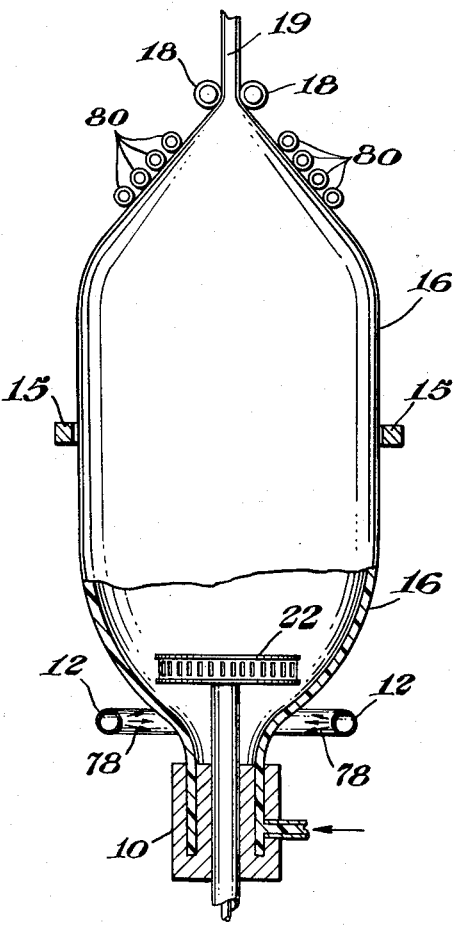

FIGURES 5 and 6, in elevation and partially in section, illustrate varieties of driven diffusers or self-impelled diffusers for directing the stream of gaseous coolant within the tube; and FIGURE 7 schematically illustrates the practice of the present invention using an external cooling ring and an external contacting centering guide about the freshly extruded film tube.

Figure 1:
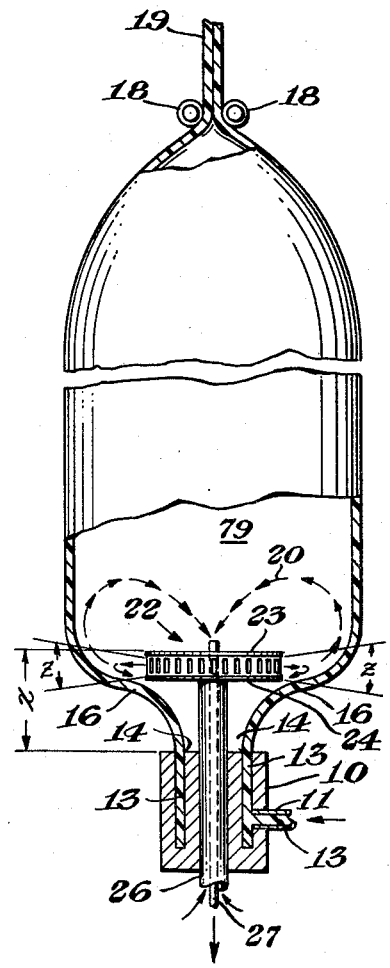

With initial reference to FIGURE 1, there is schematically portrayed the essentials of an operation according to the present method utilizing an apparatus embodiment adapted for its accomplishment. A tube die 10 of any generally conventional or otherwise desired variety is employed for the extrusion. The die 10 is fed through an inlet conduit 11 with a fused or molten film-forming, resinous or polymeric composition 13, such as a film-forming polyethylene or polypropylene composition or other suitable or desirable film-forming material. The molten resinous composition 13 is provided under suitable extrusion pressure from a supply source (not shown), such as a fluid-forwarding and metering pump or its equivalent or an extruder screw or the like apparatus. The molten composition is extruded through the generally circular ring-like or annular orifice 14 of the tube die 10 to form the freshly extruded film tube 16 of the polymeric composition. Although in most cases it is satisfactory for the tube die 10 to have a circular or at least nearly circular orifice 14, it may also be suitably formed in oval, elliptical and other forms that are only generally circular in outline.

The freshly extruded plastic film tube 16 is oriented simultaneous with extrusion by a distending gas bubble 79 which is trapped within the tube under sufficient pressure to cause stretching of the tube. The film tube 16 is advantageously (and usually) expressed along an extrusion center line that passes longitudinally through the center of the tube die 10. The film tube 16, after being oriented by the distending gas bubble 79, is withdrawn from the die 10 through a pair of pinch rolls 18. Advantageously, this is subsequent to passage through collapsing guides 80 (shown in FIGURE 7) which tend to flatten the tube film so that it may be more efficiently grasped and handled in the bight of the rolls 18. The nip or pinch rolls 18 (or their equivalent flattening means) may either be hydraulic stationary pressure rolls or driven rolls, depending upon whether a mere collapsing or a forwarding and withdrawing action is desired by such installation. The compressive effect of the nip roll pairs utilized for flattening the film tube should be light enough to avoid any undesired crushing or fusion reaction on the freshly extruded tube.

Figure 2:
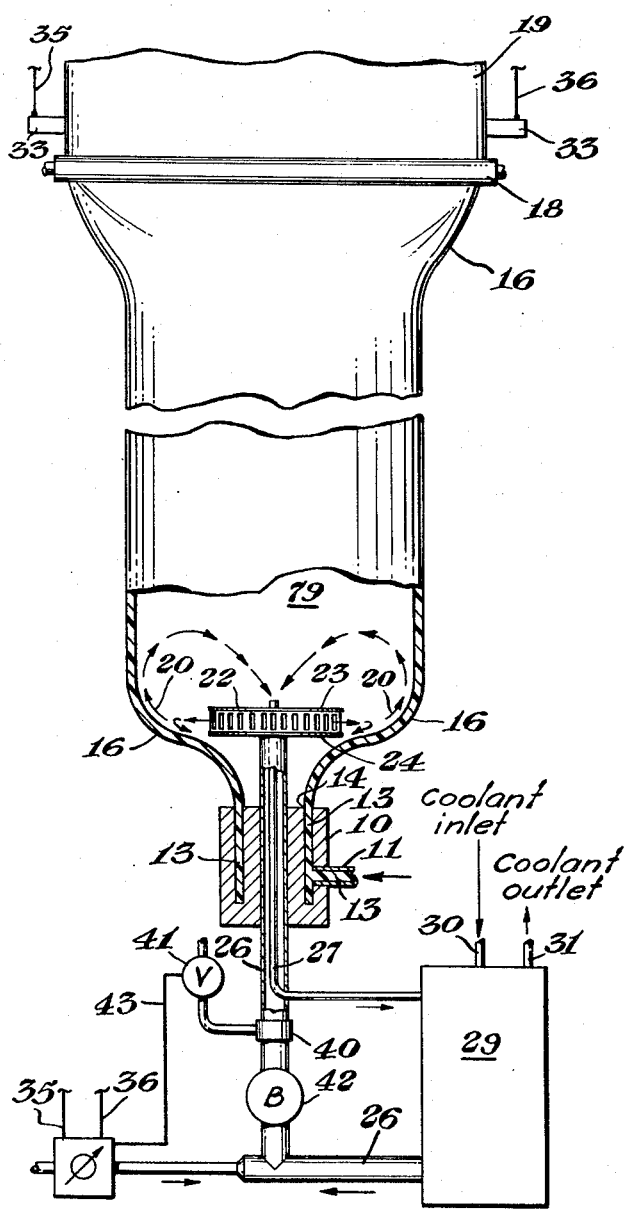

Although the film can be extruded in any direction, it is generally advantageous, as indicated in FIGURE 2, to have a vertically upward (or vertically downward) center line of extrusion.

The freshly extruded film tube 16 (upon its emergence from the die and prior to or during its distention and stretching by the trapped bubble of gas 79) is cooled to a temperature beneath its thermoplastic temperature or point of fusion by means of a radially directed inner circumferentially impinging stream of air or other gaseous coolant fluid, indicated generally by the reference numeral 20. The coolant stream 20 is directed against the inner surface of the film tube 16. The cooling air (or other fluid) is admitted through an inlet 26 under suitable pressure to maintain the distending gas bubble 79 as desired for the operation. After circulation and warming within the film tube, the air or other fluid is withdrawn through an outlet 27.

Advantageously, as indicated, the outlet 27 is centrally and coaxially disposed within the fluid inlet 26. Likewise, as is apparent and as has been indicated, the cooled fluid, such as air, is admitted to the tube and the warm air (or other fluid employed) withdrawn therefrom at such a predetermined rate as to achieve the desired cooling effect upon the freshly extruded film tube while maintaining the distending bubble 79 within the tube under sufficient pressure to accomplish the desired degree of orientation of the freshly extruded film product.

It is generally advantageous, as specifically illustrated in FIGURE 2, to utilize cool air or other gaseous fluid in a closed, substantially gas-tight system wherein the cool fluid is continuously introduced and withdrawn from the freshly extruded tube and recirculated through an external heat exchanging or the like system whereby the warm fluid withdrawn from the tubing is efficiently cooled to a desired temperature by the heat transfer medium prior to recirculation into the tubing. Thus, warm air withdrawn through the outlet 27 is passed through a heat exchanger 29, which may be of the water cooled variety having an inlet 30 and an outlet 31 for the coolant. The warm fluid from the outlet conduit 27, after being cooled in heat exchanger 29, is recirculated through the inlet conduit 26 to the diffuser 22 for repassage through and reuse in the freshly extruded film tube.

In order to compensate for any loss of air or other gaseous fluid from the distending bubble 79 through the pinch rolls 18 or by diffusion through the thin wall of freshly extruded tube 16, it is generally advantageous to utilize a sensing device in the system which can accordingly detect any gas losses therein and, in turn, activate an increased supply of cooled fluid, such as air, to compensate for the loss. This may be accomplished by use of a width measuring device 33 on the flattened sheet of tubing 19 as it is withdrawn from the pinch rolls 18. This device is connected pneumatically, by means of the tubes 35–36, to a pneumatically activated air (or other gaseous fluid) regulator 38 of any desired or suitable variety.

Thus, air regulator 38, in cooperation with the width measuring device 33, operates to control the flow of coolant fluid into the film tube through the inlet conduit 26 by means of the conduit 39 which communicates with the air regulator 38. Thus, in the event that any air (or other gaseous fluid) is lost from the distending bubble 79, the diameter of the freshly extruded tube 16 will lessen and cause the width of the flattened sheet 19 to diminish. This is sensed by the measuring device 33 which relates the information to the regulator 38 which, in turn, compensates for the loss by allowing more air to be admitted to the interior of the tube through conduit 39 and the inlet conduit 26 to replenish the loss.

As indicated, a variable speed blower 42 in the inlet conduit 26 is utilized to force the cooled gaseous fluid through the tube. Alternatively, if the pressure build-up in the distending bubble 79 is too great, the sensing device 33 (upon noticeable increase in the width of the flattened tube 19) relates the information to the regulator 38 which in turn pneumatically relates the information through tube 43 to (and to actuate) bleedoff valve 41. The resulting bleedoff of excess air from the system through the air restrictor 40 and valve 41, as is apparent, automatically controls and regulates the system.

Figure 3:
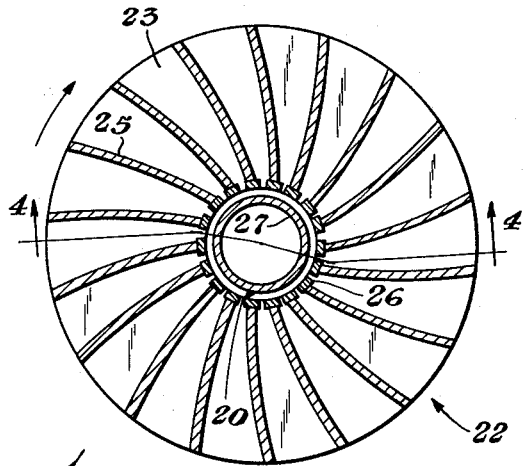
FIGURE 3 illustrates, in cross-sectional plan, a typical diffuser for effecting the cooling stream of gaseous fluid within the freshly extruded tube.
Figure 4:
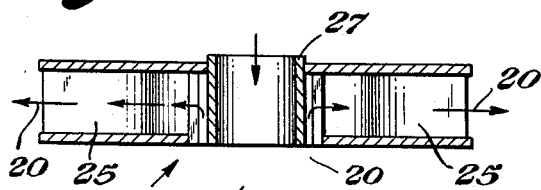
FIGURE 4 is a cross-sectional elevation of the diffuser as taken along the line 4—4 of FIGURE 3.

In FIGURES 3 and 4 is illustrated a particular diffuser that is utilized in the practice of the invention. As indicated, diffuser 22 comprises a circular air-directing element 23. This element 23 contains a plurality of curved vanes 25 which extend radially from the air inlet conduit 26 to the circumferential extremity of the air directing element. The cool air stream 20 travels from the air inlet 26 by way of inlet ports 28 to the passages between vanes 25 and exits from the element through apertures 24. The warm air is withdrawn through air outlet 27 as indicated by the directional arrow in FIGURE 4. The diffuser may be made to rotate in the direction indicated by the directional arrow in FIGURE 3 either by an external power source or by the tangential movement of the air stream 20.

If it is desired to utilize a driven diffuser, FIGURE 5 illustrates one embodiment convenient for the purpose. In the device illustrated, diffuser 22 is made common with and affixed to air inlet 26 by way of collar 21. This is effected such that no leakage of air is permitted between the diffuser and collar and that no slippage is permitted with respect of each other of the air inlet and collar. A weld joint or a bolted joint with suitable gasket or packing is beneficial. Air inlet 26 is connected to a power drive mechanism (not shown) generally external to the film tube to provide rotation of the air inlet and diffuser. Conventional bushing or bearing, stuffing box or packing arrangements can be employed to allow rotation of the air inlet 26 within the tube die without leakage of air from the film tube. Packed bearings 32 are positioned as indicated in order to allow diffuser 22 to revolve about air outlet 27 with a minimum of friction. In this respect, any adaptable roll or ball bearing may be used. The packing may be of any suitable type that will prevent or keep to a minimum air leakage through the bearing area.

Alternatively, an arrangement of a packing independent of the bearing can be used with advantage. Air stream 20 thus enters diffuser 22 from air inlet 26 and is centrifugally accelerated outwardly through apertures 24 by the rotating motion of the diffuser.

With reference to FIGURE 6, there is shown an illustration of a self-impelled diffuser in accordance with an embodiment of the invention. In this arrangement, diffuser 22 is positioned so as to be freely rotatable about both air inlet 26 and air outlet 27. A packed bearing, as discussed with reference to FIGURE 5, allows for low frictional rotation about air outlet 27. In like manner, diffuser 22 rests and rotates upon bearings 34 which are contained in bearing tray 37 attached to air inlet 26. The bearings may be of a packed variety thus preventing air leakage therethrough. Or, alternatively, an independent packing or stuffing box arrangement may be employed for the purpose. Aligning ring 44, depending from the bottom of diffuser 22, extends between bearings 34 to perform the two-fold purpose of keeping the diffuser in alignment and to assist in completing a seal against air leakage through the bearings. Although complete freedom from air leakage through the bearings is not essential, more efficient operation is obtained if it is prevented or kept to a minimum. Rotation of the diffuser is provided from the moving air entering the diffuser from air inlet 26. It is beneficial that deflectors of some sort be provided in the diffuser so that a tangential air motion creates the rotating thrust. For example, the arrangement of the curved vanes 25 as illustrated in FIGURE 3 can be used with advantage.

In FIGURE 7 there are schematically shown several embodiments in accordance with the invention. Thus, an external cooling ring is positioned around the outside of the freshly extruded film tube 16 to externally cool the film tube 16 and thus provide an efficient cooling of the tube in conjunction with diffuser 22. Cooling ring 12 is generally a ring having perforations through which air is directed at the film tube at a point not too distant from tube die 10 as indicated by the arrows in FIGURE 7. In the preparation of the film tube in accordance with the invention, centering guides 15 may be desirable and advantageous to keep the tube from becoming misaligned or wavering due to convection currents or such other disturbances. Any significant change in the alignment of the tube may cause material consequences in film uniformity due to uneven cooling of the freshly extruded film tube. Collapsing guides 80 initiate the collapsing of the film tube so that a rather gradual depression is effected. By the time the film tube enters the nip of rolls 18, it has approximately reached the maximum desired width of flattened film tube 19.

It is generally advantageous for the radially impinging stream of air (or other gaseous fluid) 20, which is employed for internal cooling of the tube, to be directed against the inner sidewalls of tube 16 at a radial distance as measured from the peripheral outlet apertures of the diffuser to the tube of between about 1/16 inch and 2 inches and preferably between about 1/8 and about 1/2 inch and, even more advantageously, not more than about 1/4 inch.

Beneficially, the cooling stream 20 is caused to impinge on the inner surface of the tube at the point where distention of the freshly extruded tube is about commencing and at a point prior to complete stretching and distention of the tube, i.e., before the tube has reached its maximum diameter. Generally, using blow-up ratios between about 1 and 10 to 1, respectively (more ordinarily, between about 2 and 5 to 1, respectively), such a point occurs between about 1/2 and 3 orifice diameters along the center line of extrusion from the face of tube die 10. Advantageously, the radially impinging circumferentially contacting stream of cooling fluid 20 is directed on the inner surface of the freshly extruded tube 16 at a distance (which, beneficially, is as small as possible to obtain) from the outlet of the orifice 14 which, in any event, is not greater than about 1 orifice diameter along the center line of extrusion.

The cooling stream of air (or other gaseous fluid) 20 is ordinarily best directed in such a manner as to radially impinge on the inner surface of the tube in a direction that is normal or at least about perpendicular to the center line of extrusion and to impinge on the surface across an area, indicated by the dimension "Z" in FIGURE 1, whose length along the center line of extrusion is also (consistent with the immediately foregoing discussion) not in excess of about 1 orifice diameter.

It is advantageous for the stream of cooling fluid 20 to be at least about 100 Fahrenheit degrees (advantageously at least 200–250 Fahrenheit degrees) beneath the temperature of the freshly extruded film. Preferably, the temperature of the cooling fluid is about 40° F. or lower and may be as low as 4° F. or so.

The rate at which the air (or other gaseous fluid) stream 20 is admitted to the internal surface of the film tube will depend somewhat on the temperature of the cooling stream and the relationship between the temperature of the cooling stream and the temperature of the extruded polymer. Ordinarily, between about 100 and 800, advantageously between 300 and 400 cubic feet of coolant (at standard conditions) per pound of polymer being extruded is employed with advantage. In this connection, particularly when polyethylene and polypropylene tubes are being manufactured, it is found to be generally advantageous for air to be utilized as the gaseous coolant and to employ it as a temperature not in excess of about 100° F. at a rate of about 400 cubic feet per pound of polymer being extruded into films of thicknesses between about 0.1 and 25 mils. Alternatively for the sake of convenience, the rate of cooling stream directed to the internal surfaces of the film tube may be expressed in terms of the lineal rate of extrusion of the polymer. Thus, advantageous, the gaseous coolant is introduced into the tube through the rotating diffuser at a rate that is in the neighborhood (giving or taking, say, about 20 or so percent) of about 1.67 cubic feet per lineal foot of film tubing having a circumference of about 7 feet (as is based on a film speed of about 60 feet per minute and a gaseous fluid rate of about 100 cubic feet per minute).

For the most part, the positioning of the external cooling ring 12 (FIGURE 12), or similar distributor, and coolant flow therethrough are similar to that employed with diffuser 22. However, modifications in this respect may be readily entered into to take account of particular operating requirements. The external ring may also be rotatable, although a stationary ring can be suitably employed.

Excellent quality thin wall film tubes having exceptional uniformity and highly desirable characteristics may easily and advantageously be prepared by practice of the present method and utilization of the present apparatus. The particularly and unusually accurate temperature control of the freshly extruded film that is achieved by the radially directed, internally circumferentially impinging rotating stream of temperature controlling gaseous coolant is especially instrumental in securing such desirable film tubes. As is apparent, it readily permits extremely close and critical temperature regulation of the freshly extruded film tube leading to precise sizing and dimensional stability of the film so prepared. Additionally, the accurate and uniform temperature control afforded by the invention significantly reduces the tendency of the film to cohere to itself. This eliminates any great need to inject powder (or the like anti-blocking agent or dust) into the tube for such purpose. Furthermore, the desired effect (or effects) is (or are) efficaciously accomplished at a convenient point in the film manufacturing operation, even though this is one of the most crucial, critical, sensitive and difficult to control areas in the process. In addition, as indicated, the same sized extruder and die head assembly can be utilized in the practice of the invention to produce film tubes of excellent quality having an advantageously wide range of diameter. This obviously provides for a much greater flexibility in the manufacturing operation.

The rotating gaseous stream directed against the internal surface has a decided effect and beneficial influence on not only the efficiency of cooling, per se, but also on the uniformity of the film. When a fixed or non-rotatable diffuser is employed, the impinging stream of air generally is directed on a limited area, or more air is delivered through one aperture than another for various reasons; with the result being that portions of the tube become more rapidly cooled to lower temperatures than others. Streaks or variations in clarity and variations in film thickness and wrinkles or puckers are created in the film product when such uneven cooling is prevalent and obtained.

However, in the practice of the present invention, wherein a rotating cooling stream is utilized, an even and equally distributed cooling of the film tube surface is afforded. This, at the least, achieves and accomplishes a complete randomization of any uneven cooling due to air (or other gaseous cooling fluid) being delivered through one or more apertures against the film tube at a greater volume or velocity. Thus, any streaking or variations(s) in film gage or thickness or the like imperfections are randomly distributed throughout the film. No malappearance of the film on the take-up rolls is evidenced. Nor are there any formations of ridges, bulges and the like in the film from a build-up of layers of heavier gage in the same transverse location along the length of the film.

Beneficially (in this connection), in order to provide the uniform cooling and assure a thorough randomization effect, the rotating diffuser is made to rotate at a rate that is between about 10 and about 40 revolutions per minute per lineal foot of extruding polymer.

As indicated, practice of the present invention is particularly useful for manufacture of tubular film from polymers of non-aromatic or aliphatic hydrocarbon olefins, such as polyethylene and polypropylene. Other hydrocarbon olefin polymers, for example, butylene polymers and copolymers of ethylene and propylene may be equally beneficially employed including both the conventional branch structured "polythene" type of polymer and linear, high density (and so-called "macromolecular") variety polymers, including those obtained in the Ziegler process. Other of the normally solid film-forming thermoplastic resinous materials are also advantageously formed into film tubes by practice of the invention. These, for instance, include: homopolymers of vinylidene chloride and copolymers of vinylidene chloride with vinyl chloride and/or acrylonitrile. The invention is also well adapted for practice when other haloethylene polymers such as polyvinylchloride, vinyl chloride/vinylacetate and other vinyl chloride copolymers, and so forth are extruded in tubular form in the indicated manner, as well as for such other halogen-containing polymer products as chlorinated polyethylene, chlorinated polypropylene, chlorinated rubber and the like. Still other of the film-forming resinous materials that may be conveniently utilized are styrene polymers, including polystyrene, film-forming copolymers of styrene with acrylonitrile, a-methyl-styrene, ethyl acrylate and the like mixtures thereof as well as for various vinyl toluene polymers; acrylonitrile polymers, cellulose acetate, cellulose acetate butyrate and other thermoplastic, film forming derivatives of cellulose; polyamides, including linear condensation products of adipic acid and hexamethylene diamine (nylon-66) and condensation products of epsilon caprolactam (nylon-6); film-forming polyesters including linear condensation products of terephthalic acid and ethylene glycol and the like polyesters; and other analogous thermoplastic resinous film-forming compositions.

The following examples further illustrate the invention and are given for only such purpose without thought to thereby limit or otherwise define same.

*Illustration "A"*

A film-forming polyethylene, having a density of about 0.923 gram per cubic centimeter and a Melt Index of about 2.2, was extruded at a temperature of about 320° F. through a tube-forming orifice having an outside diameter of about 12 inches and an orifice opening having a radial thickness of about 0.0020 inch. The hot polymer was extruded into air at room temperature over a trapped air bubble which effected a blow-up ratio of about 1.8 to 1 of the film tube. On passing to the nip of a pair of collapsing rolls, the tube passed between collapsing guides which tended to flatten the tube. The tube travelled about 15 feet from the die to the point of collapse. A 34 inch wide by 0.0015 inch thick (double thickness) sheet of polyethylene was obtained.

In one instance (designated Run "I"), the tube was cooled by directing air against the external surface of the tube from a ring, circumscribing the tube, which was positioned about ¾ inch from the die. Air was supplied from the external ring to the tube at about 100 c.f.m. at a temperature of about 70° F.

In the second instance (designated Run "II"), a rotating 11 inch diameter air diffuser of the type represented in FIGURE 3 of the drawing (power driven from a source external the tube) was positioned inside the tube so that the diffuser rotated about an axis coincident with the axis of extrusion. This was employed in addition to (and conjunction with) the external cooling ring used in Run "I."

The diffuser was located about ½ inch from the die and its periphery was about ½ inch from the inner surface of the film tube about its circumference. The diffuser rotated about 140 r.p.m. and delivered to the internal tube surface about 50 c.f.m. of air at about 40° F. The air was delivered to the diffuser through the annular space between coaxial conduits supporting the diffuser. The air was then exited from the film tube through the inside conduit of the coaxial conduits at about the same rate it was entered (i.e., about 50 c.f.m.); then passed through a heat exchanger outside of the extrusion apparatus; and finally recycled through a variable speed blower to the film tube through the annular space and rotating diffuser.

The air from the diffuser impinged against the film surface in a direction about perpendicular to the line of extrusion. In addition, immediately after passing through the collapsing rolls, the flattened tube was engaged by a width sensing device operating in cooperation with the internal cooling air using a system like that described in the foregoing in connection with FIGURE 2 of the accompanying drawing.

A summary of the results of these two runs, "I" and "II," is given in the following table:

| | External Cooling Only (I) | External and Internal Cooling (II) |
|---|---|---|
| Extruder screw speed (r.p.m.) | 40 | 65 |
| Film takeaway speed (ft./min.) | 45 | 67 |
| Film production rate (lb./hr.) | 75 | 113 |

It is thus quite apparent that the method of the invention provides for much higher production rates. This in large measure, may be principally attributed to the significantly superior uniformity in gage throughout the film of Run "II" which allows for faster take-up speeds. Smooth, even rolls of film were obtained in Run "II," whereas, in Run "I," uneven, rippled (and thus undesirable) rolls of film were obtained forcing slower take-up speeds to be used in order to avoid splitting and tearing of the film. It was also observed that all of the inside surface of the collapsed tube of Run "I" showed pronounced propensity to block or cohere to itself. In contrast, the collapsed tube of Run "II" was essentially completely free from any blocking tendency.

Furthermore, the overall width along the length of the flattened tube of Run "II" was significantly more uniform than that of Run "I." This superior width uniformity provides not only a more desirable and useful product, but also eliminates waste when it is desired to edge trim the flattened tube to obtain two planar sheets of the film.

*Illustration "B"*

In accordance with the same general procedure and utilizing the same polymer in preparing film in Run "II" of Illustration "A," a film tube was prepared as follows:

The polyethylene was extruded at a temperature of about 400° F. through a tube-forming orifice having an outside diameter of about 4 inches and an orifice opening having a radial thickness of about 0.0020 inch. The blow-up ratio was about 1.9 to 1. A 12 inch wide by 0.0015 inch thick (double thickness) sheet of polyethylene was obtained at about 18 lb./hour. A take-away rate of about 22.5 ft./min. was used. An external cooling ring was positioned around the tube about ½ inch from the orifice and ½ inch from the outside periphery of the film tube. Between 50 and 75 c.f.m. of air at about 70° F. were delivered through the external ring to the external film surface. As in Run "II" of Illustration "A," a rotatable air diffuser was positioned within the film tube and rotated at about 120 r.p.m. from an external power source. The diffuser was of the type illustrated in FIGURE 3 of the drawing, which might be referred to as a "squirrel cage" type, having a diameter of about 3 inches. It was positioned about ½ inch from the orifice along the line of extrusion and its periphery was about ½ inch from the internal film surface. Approximtaely 35 c.f.m. of air at 60–65° F. were delivered through the diffuser to the internal film surface. The warmed air was withdrawn, as in Run "II" of Illustration "A," through the axial conduit supporting the diffuser to an external heat exchanger where it was cooled prior to being reentered into the film tube.

The flattened film tube had excellent clarity and was free of the tendency to block. It also was readily subjected to further processing and handling treatments without difficulty, it being of exceptionally uniform gage and texture.

In contrast, when tubular film is prepared according to the immediately foregoing procedure, excepting to utilize a simple conduit or pipe to deliver the cooling air into the film tube or to utilize a stationary diffuser or nozzle to deliver the cooling air into the film tube, significantly inferior products result. These film tubes are characterized in an undesirable tendency to block and in being of non-uniformity in appearance and thickness, exhibiting streaks and thick-thin variations, which deter from the utility of the film and interfere with subsequent processing such as roll take-up, heat-sealing, laminating and such other operations to which the film is subjected.

The method and apparatus of the invention may also be utilized in the described manner to prepare film tubes of other thermoplastic resins.

Certain changes and modifications can be readily entered into in the practice of the present invention without substantially departing from its intended spirit and scope. Therefore, it is to be fully understood that the invention is not intended nor should it be considered to be limited or in any manner restricted by or to the delineated and preferred embodiments thereof which are contained in the foregoing description and specification. Rather, the invention is to be interpreted and construed in the light of what is set forth and defined in the hereto appended claims.

What is claimed is:

1. Method of producing film from a thermoplastic resinous film-forming material which comprises:
   (a) extruding a fused thermoplastic film-forming resin through a generally circular extrusion orifice in a tube die in the form of a seamless film tube;
   (b) withdrawing said freshly extruded film tube away from said die and radially expanding said film tube over a trapped gaseous bubble;
   (c) flattening said expanded film tube with flattening means positioned at a distance from said die;
   (d) continuously applying to the exterior surface of said tube, immediately after its extrusion and prior to its being expanded to its maximum diameter, a circumenveloping gaseous coolant stream at a temperature beneath the temperature of said freshly extruded film tube; and (e) continuously applying to the interior surface of said tube, immediately after its extrusion and prior to its being expanded to its maximum diameter, a stream of gaseous coolant for the tube, which stream is at a temperature beneath the temperature of said freshly extruded film tube and which is omniradially directed against the inner surface of the tube from a peripheral outlet within the tube while being rotatingly swept thereon on a line about perpendicular to the axis of extrusion of said tube.

2. The method of claim 1, wherein said thermoplastic film-forming resin is polyethylene.

3. The method of claim 1, wherein said thermoplastic film-forming resin is polypropylene.

4. The method of claim 1, wherein said thermoplastic film-forming resin is a copolymer of ethylene and propylene.

5. The method of claim 1, wherein the radial distance of travel of said stream within said tube prior to initial cooling impingement against the inner surface of the tube is between about 1/16 inch and about 2 inches.

6. The method of claim 5, wherein said radial distance of travel of the stream is between about 1/8 and 1/2 inch.

7. The method of claim 1, wherein said omniradially extending stream of gaseous coolant is applied to said interior surface of said tube at a distance from said extrusion orifice, as measured along the axis of extrusion, that is between about 1/2 and 3 times the average diameter of the extrusion orifice employed.

8. The method of claim 7, wherein said distance from said extrusion orifice, as measured along the axis of extrusion, is about 1 orifice diameter and the blow-up ratio of said expanding tube in respect of said trapped gaseous bubble is between about 2 and 5 to 1.

9. The method of claim 1, wherein said omniradially extending stream of gaseous coolant is applied to said interior surface at a temperature that is at least about 200 Fahrenheit degrees beneath the temperature of said freshly extruded thermoplastic resin and at a rate of between about 100 and 800 cubic feet of gaseous coolant per pound of said extruded resin.

10. The method of claim 9, wherein the temperature of said gaseous coolant is between about 4° F. and about 40° F.

11. The method of claim 1, and including the additional steps of:

(f) withdrawing from the interior of said film tube said gaseous coolant after it has been warmed;

(g) cooling said withdrawn gaseous coolant at a point external to the extrusion area; and (h) subsequently recycling said cooled gaseous coolant into the interior of said tube in said rotating, omniradially extending stream of coolant fluid,
 said withdrawing cooling and recycling of said gaseous coolant being accomplished in a closed system.

12. Method of producing film from a thermoplastic resinous lfim-forming material which comprises:

(a) extruding a fused thermoplastic film-forming resin through a generally circular extrusion orifice in a tube die in the form of a seamless tube;

(b) withdrawing said freshly extruded film tube away from said die and radially expanding said film tube over a trapped gaseous bubble;

(c) flattening said expanded film tube with flattening means positioned at a distance from said die;

(d) continuously applying to the exterior surface of said tube, immediately after its extrusion and prior to its being expanded to its maximum diameter, a circumenveloping gaseous coolant stream at a temperature beneath the temperature of said freshly extruded film tube;

(e) continuously applying to the interior surface of said tube, immediately after its extrusion and prior to its being expanded to its maximum diameter, an omniradially extending stream of gaseous coolant at a temperature beneath the temperature of said freshly extruded film tube from the periphery of a generally circular rotating diffuser, said diffuser rotating about an axis coincident with the axis of extrusion of said tube;

(f) continuously wtihdrawing from the interior of said film tube said gaseous coolant after it has been warmed;

(g) cooling said withdrawn gaseous coolant at a point external to the extrusion area;

(h) recycling said gaseous coolant into the interior of said tube through the periphery of said rotating diffuser,
 said withdrawing, cooling and recycling of said gaseous coolant being accomplished in a closed system; and (i) engaging said flattened film tube shortly after passing through said flattening means with width measuring means,
 said width measuring means cooperating with said withdrawing, cooling and recycling system in a manner whereby the size of said trapped gaseous bubble may be increased and decreased to a predetermined size by increasing and decreasing, respectively, the amount of gaseous coolant entered into said film tube.

13. The method of claim 12, wherein said thermoplastic film-forming resin is polyethylene.

14. The method of claim 12, wherein said thermoplastic film-forming resin is polypropylene.

15. The method of claim 12, wherein said thermoplastic film-forming resin is a copolymer of ethylene and propylene.

16. The method of claim 12, wherein the radial distance from the periphery of said rotating diffuser to said interior surface of said tube is between about 1/16 inch and 2 inches.

17. The method of claim 16, wherein said radial distance is between about 1/8 and 1/2 inch.

18. The method of claim 12, wherein said omniradially extending stream of gaseous coolant is applied to said interior surface of said tube at a distance from said extrusion orifice, as measured along the axis of extrusion, that is between about 1/2 to 3 times the diameter of said extrusion orifice.

19. The method of claim 18, wherein said distance from said extrusion orifice, as measured along the axis of extrusion is about 1 orifice diameter.

20. The method of claim 12, wherein said omniradially extending stream of gaseous coolant is applied to said interior surface of said tube at a temperature at least about 200 Fahrenheit degrees beneath the temperature of said freshly extruded thermoplastic resin and at a rate of between about 100 and 800 cubic feet of gaseous coolant per pound of said extruded resin.

21. Apparatus for manufacturing film from thermoplastic resinous film-forming materials which comprises, in cooperating combination:

(a) a tube die adapted to extrude a seamless film tube;

(b) flattening means positioned a distance from said die for flattening said freshly extruded tube;

(c) an inlet and an outlet conduit passing through said die from without and into the space that is enveloped by said freshly extruded tube;

(d) a generally circular diffuser rotatably disposed on the extrusion side of said die so as to rotate about an axis coincident with the extrusion axis of said die,
 said diffuser being further adapted to deliver from its peripheral edge a gaseous coolant to the interior surface of a tube as it is freshly extruded from said die,
(e) a means of communicating gaseous fluid from the inlet conduit to said diffuser so as to permit delivery of a gaseous coolant to said diffuser; and
(f) means to withdraw warmed gaseous coolant from said film tube through said outlet conduit.

22. The apparatus of claim 21, including, in addition thereto and in combination therewith:
(g) means disposed without and circumferentially about a tube of film after it has been freshly extruded from said die that are adapted to deliver a gaseous coolant to the exterior surface of tube after it is freshly extruded from said die.

23. The apparatus of claim 21, including, in addition thereto and in combination therewith:
(h) gaseous fluid propelling means and means for cooling gaseous fluid at a point away from said die and interconnected with said inlet and outlet conduits so as to recycle used gaseous coolant from said outlet through said cooling means back to said inlet.

24. The apparatus of claim 21, wherein said inlet and outlet conduits are coaxially disposed relative to one another.

25. The apparatus of claim 24, wherein said conduits are coaxially disposed about on the center line of extrusion of said die and said diffuser is supported by and at the internal end of said inlet conduit.

26. The apparatus of claim 21, wherein said diffuser is so proportioned and disposed that the radial distance between its peripheral edge and the inner surface of a film tube after extrusion from said die is between about 1/16 inch and about 2 inches.

27. The apparatus of claim 26, wherein said radial distance is between about 1/8 and about 1/2 inch.

28. The apparatus of claim 21, wherein the axial distance between said diffuser and said die is between about 1/2 and 3 times the diameter of said die orifice.

29. The apparatus of claim 21, wherein the axial distance between said diffuser and said die is about equal to the diameter of said die orifice.

30. The apparatus of claim 21, wherein said diffuser is adapted to handle between about 100 and about 800 cubic feet of gaseous coolant for each pound of resin that said die is adapted to extrude into film.

31. Apparatus for manufacturing film from thermoplastic, resinous, film-forming materials comprising, in cooperating combination:
(a) a tube die adapted to extrude a seamless film tube;
(b) means adapted to be disposed without and circumferentially about a tube of film freshly extruded from said tube die and further adapted to deliver a gaseous coolant to the exterior surface of said freshly extruded tube;
(c) flattening means positioned a distance from said die for flattening said freshly extruded tube;
(d) an inlet and an outlet conduit coaxially disposed relative to each other and passing about centrally through said die from without and into the space that is enveloped by a film tube when it is freshly extruded from said die;
(e) a generally circular diffuser supported by and rotatably disposed about said conduits so as to rotate about an axis coincident with the axis of revolution of said die,
said diffuser being further adapted to deliver from its peripheral edge a gaseous coolant to the interior surface of said freshly extruded tube,
said inlet conduit terminating in cooperating relationship with said diffuser so as to deliver a gaseous coolant to the inside of said diffuser;
(f) recycle means comprising blower means and cooling means cooperatively interconnected to withdraw warmed gaseous coolant from said film tube through said outlet conduit, cool said warmed gaseous coolant and recycle it to said conduit; and
(g) width sensing means, located beyond said flattening means, adapted to engage said flattened tube and continuously measure its width,
said width sensing means cooperating with:
(h) a regulating means that is in working relationship with said recycle means and adapted to introduce to and bleed off from said recycle means said gaseous coolant.

References Cited in the file of this patent
UNITED STATES PATENTS

| | | |
|---|---|---|
| 2,632,206 | Pierce | Mar. 24, 1953 |
| 2,641,022 | Kress | June 9, 1953 |
| 2,668,323 | Johnson | Feb. 9, 1954 |
| 2,844,846 | Kronholm | July 29, 1958 |

FOREIGN PATENTS

| | | |
|---|---|---|
| 571,392 | Canada | Feb. 24, 1959 |
| 1,190,773 | France | Oct. 15, 1959 |
| 1,106,951 | Germany | May 18, 1961 |